(12) United States Patent
Lell

(10) Patent No.: US 6,556,119 B1
(45) Date of Patent: Apr. 29, 2003

(54) HIGH CURRENT INTENSITY FUSE DEVICE

(75) Inventor: Peter Lell, Moosburg (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/673,862
(22) PCT Filed: Apr. 19, 1999
(86) PCT No.: PCT/DE99/01168
  § 371 (c)(1),
  (2), (4) Date: Mar. 12, 2001
(87) PCT Pub. No.: WO99/54904
  PCT Pub. Date: Oct. 28, 1999

(30) Foreign Application Priority Data

Apr. 19, 1998 (DE) .......................................... 198 17 133

(51) Int. Cl.⁷ .................... H01H 71/20; H01H 71/02; H01H 71/14; H01H 39/00
(52) U.S. Cl. .................. 337/157; 337/182; 337/409; 337/401; 307/10.1; 307/119; 180/279; 180/283; 200/61.08
(58) Field of Search ................. 337/157, 182, 337/401–409, 185; 307/9.1–10.8, 119; 180/271, 274, 279–283; 200/61.08; 361/115

(56) References Cited

U.S. PATENT DOCUMENTS

| 3,873,786 A | * | 3/1975 | Lagofun | ................ 200/61.08 |
| 3,932,717 A | * | 1/1976 | Dike et al. | .............. 200/61.08 |
| 3,958,206 A | * | 5/1976 | Klint | ........................ 337/160 |
| 4,224,487 A | * | 9/1980 | Simonsen | ............... 200/61.08 |
| 4,311,890 A | * | 1/1982 | Schroder | ................ 200/61.08 |
| 4,417,519 A | * | 11/1983 | Lutz | ............................ 102/263 |
| 4,677,412 A | * | 6/1987 | Sibalis | ....................... 337/401 |
| 4,920,446 A | * | 4/1990 | Pflanz | ......................... 337/30 |
| 5,360,999 A | * | 11/1994 | Upshaw et al. | ................ 124/3 |
| 5,783,987 A | * | 7/1998 | Kern et al. | ..................... 337/4 |
| 5,808,253 A | * | 9/1998 | Hatakeyama | ............... 102/263 |
| 6,194,988 B1 | * | 2/2001 | Yamaguchi et al. | ......... 180/279 |
| 6,281,781 B1 | * | 8/2001 | Yamaguchi | ................. 337/182 |

FOREIGN PATENT DOCUMENTS

| DE | 1 064 613 | 9/1959 |
| DE | 44 13 847 A1 | 11/1995 |
| DE | 43 38 157 C1 | 12/1995 |
| DE | 296 14 976 U1 | 1/1997 |
| DE | 297 00 594 U1 | 4/1997 |
| EP | 0 725 412 A2 | 8/1996 |
| JP | 10-55742 A | * 2/1998 | .......... H01H/39/00 |

OTHER PUBLICATIONS

EP 96 10 0812-13 European Search Report (in the German language).

* cited by examiner

Primary Examiner—Anatoly Vortman
(74) Attorney, Agent, or Firm—Fay, Sharpe, Fagan, Minnich & McKee, LLP

(57) ABSTRACT

The invention relates to a device for isolating an electric circuit, especially for high current intensities, with a housing (1) in which is provided at least one electrical conductor element (3) which presents an isolating area (9) and which can be wired in such manner into the severable electric circuit that the isolating current path passes over the conductor element (3) and with activatable means(13, 7; 3, 9, 7), provided in or at housing (1) for generating a trigger pressure which acts directly upon the isolating area (9) and/or via a driving surface (17, 23, 39, 41), in its original position, impinging upon the isolating area (9), wherein the isolating area (9) and/or the driving surface (17, 23, 39, 41) is designed in such manner that after activation of the means (13, 7; 3, 9, 7) the isolating area (9) is totally isolated or broken out, or the cross-section of the isolating area (9) is reduced.

16 Claims, 5 Drawing Sheets

Figure 15A:
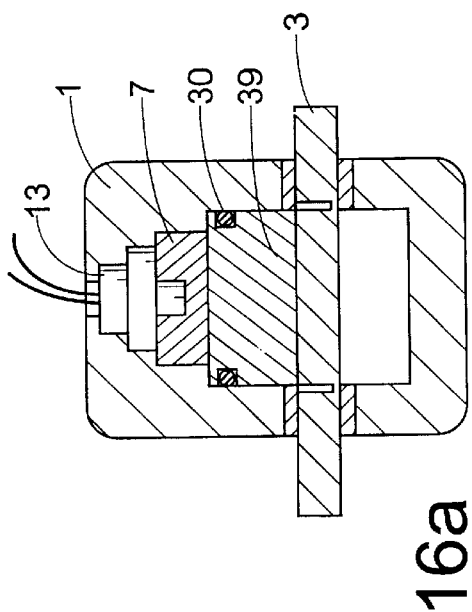

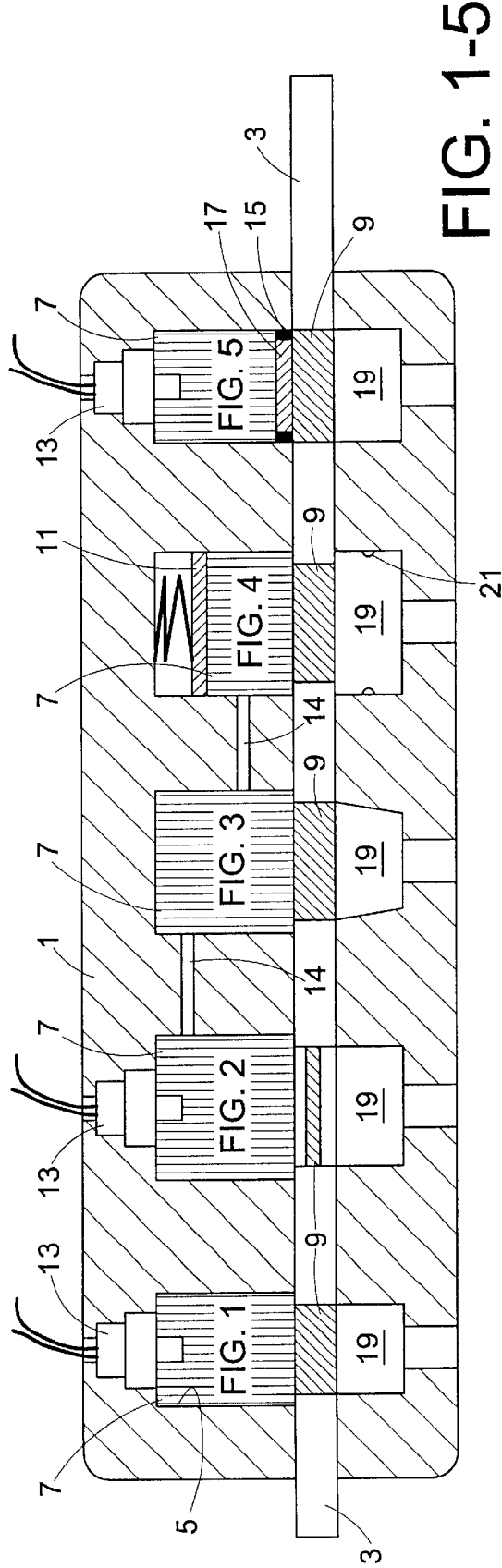
FIG. 1-5
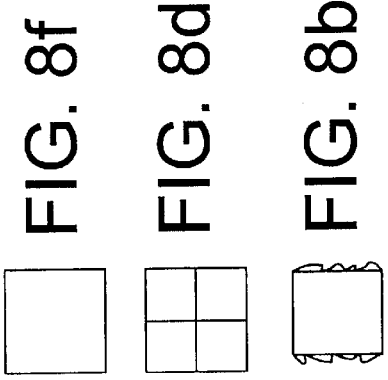
FIG. 8f
FIG. 8d
FIG. 8b
FIG. 8e
FIG. 8c
FIG. 8a
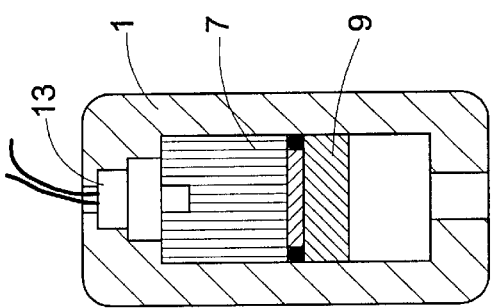
FIG. 7
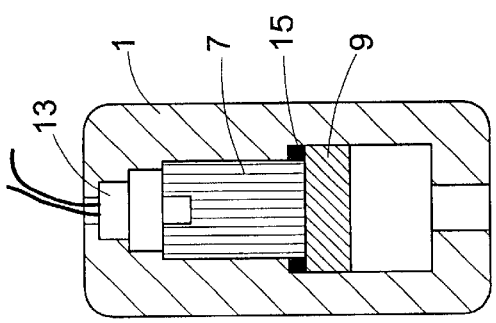
FIG. 6

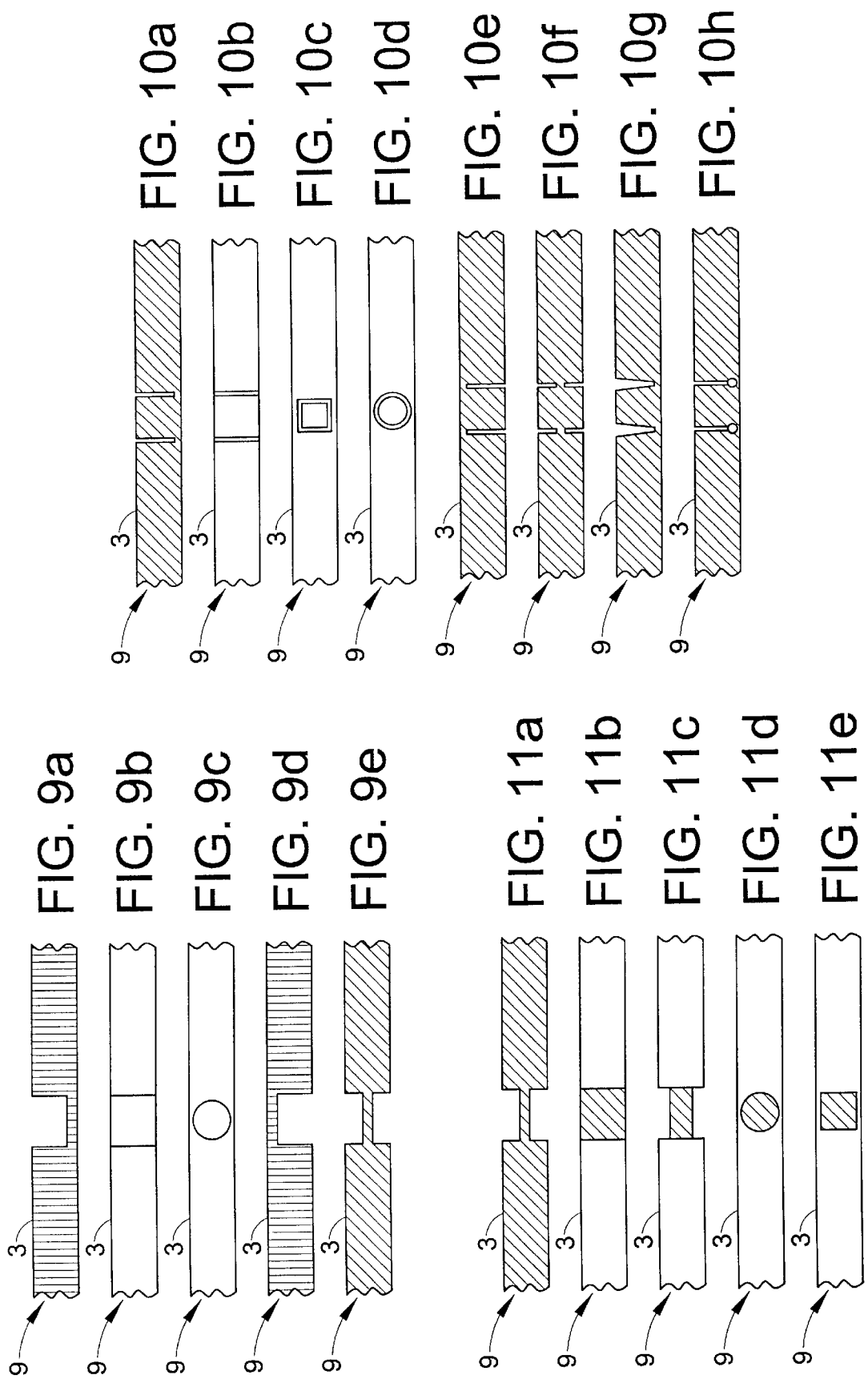

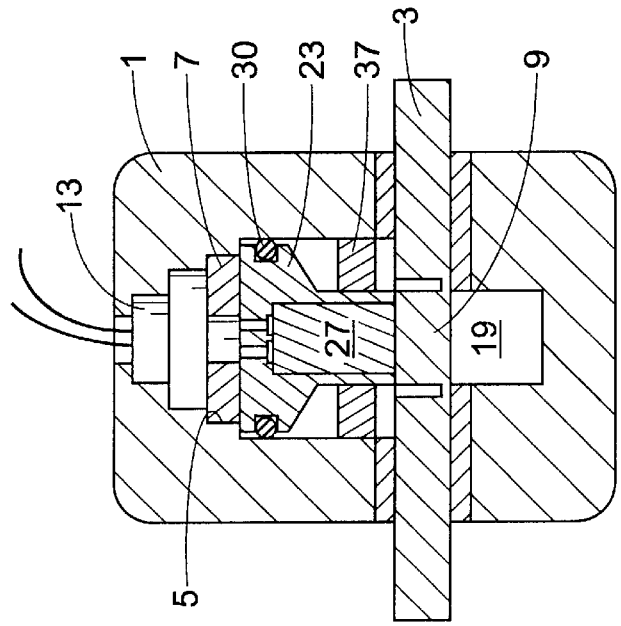
FIG. 12
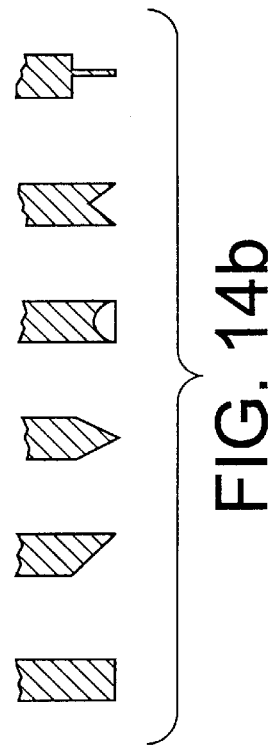
FIG. 14a
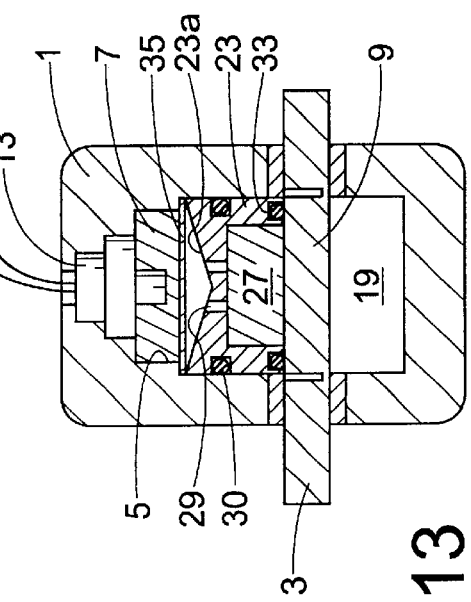
FIG. 13
FIG. 14b

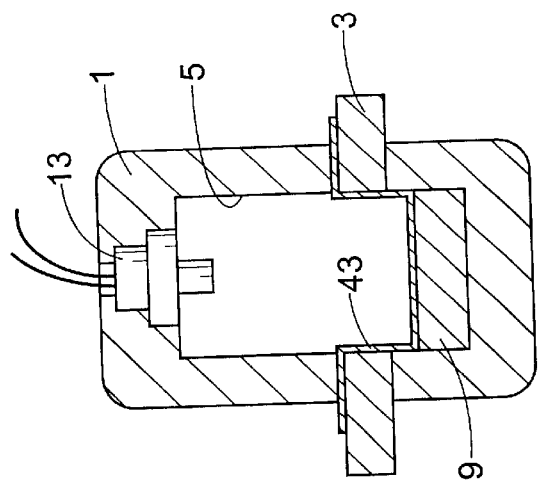
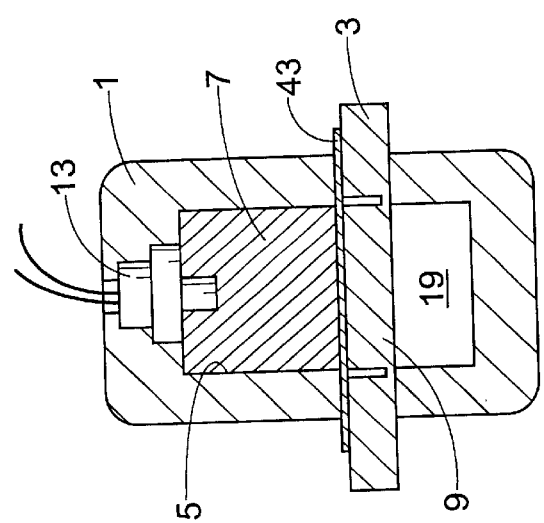
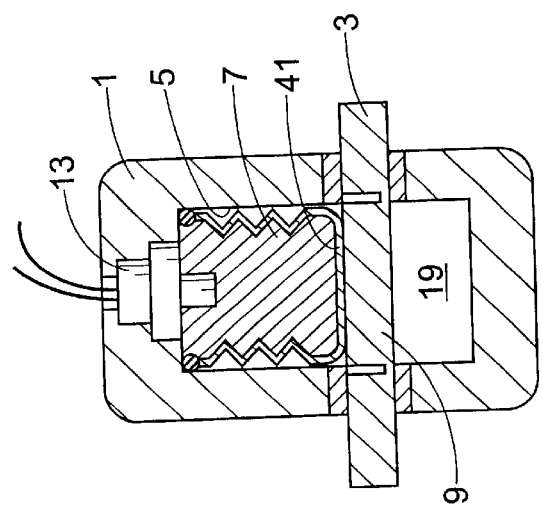

HIGH CURRENT INTENSITY FUSE DEVICE

The invention relates to a device for isolating an electric circuit, especially for high current intensities.

Switches, or in the most general of meanings, devices are needed for the most diverse applications, which will quickly and safely, in irreversible manner, isolate an electrical circuit, especially in case of injury or other emergencies, in order to prevent damage to technical equipment or endangerment of human beings. Such devices are especially required when high current intensities are present in technical equipment,.for example in energy distribution networks or in automotive engineering. Such devices for isolating an electric circuit must meet high safety requirements; in particular, the electric circuit must be isolated sufficiently quickly and securely, in irreversible fashion, without possibility of causing injury to technical equipment or human beings by the switching process itself In addition, such devices must be highly maintenance free, and be able to function reliably, even after long periods of inactivity, for example, even after up to 20 years.

In automotive engineering, it is necessary or desirable, in case of accident, to definitely and irreversibly separate, in the shortest possible time, the battery from the wiring of the vehicle. In this fashion it is possible to avoid sources of ignition formed by sparks and plasma, which are created when cable isolations are scraped off during an accident due to sheet metal penetration from the car or loose cable ends hitting against each other or against sheet metal parts, and which may ignite escaping gasoline or cause an explosion of ignitable gasoline-air mixtures developing after an accident.

An electric safety switch is known from DE 297 00 594 U1 to realize a device for isolation of an electric circuit in which high intensity current flows, in regard to which a conductor, located in a housing, is isolated by means of a pyrotechnically accelerated, electrically isolating separation body.

In its original position, the separation body is located at a certain distance from the conductor element to be severed and is accelerated in the direction toward the conductor element, following the triggering of a propellant charge provided in a combustion chamber, for example due to a signal which also serves for triggering an air bag.

As a result of an indentation in the otherwise relatively large cross-section of the conductor element, the conductor element or this separation area breaks very quickly. Underneath the conductor element to be severed, space is provided into which are bent the conductor ends to be severed, and which also accepts the separation body. Thus, with this device, the conductor ends are not torn off or ejected in uncontrolled fashion. However, if with this type of a device, a high intensity current flows within the conductor element, an electric arc is formed as soon as a cut-off occurs in the conductor element, so that initially the flow of current continues at practically full intensity.

The electric arc is then, however, extinguished extremely quickly via the electrically isolating separation element. While this results in achieving a quick, irreversible shut-off of the current flowing from the battery to the consumers or of a short-circuit current, very high tension peaks are created by self-induction, due to the always existing inductivities in the load of the circuit, as a result of which there is the risk of causing irreversible damage to connected instruments and isolations.

In addition, a pyro-technical separation device is known from DE 44 38 157 C1, which likewise operates according to the same principle. Here also, an isolating separation element is accelerated by means of a propellant charge and cuts-off an element to be severed. Toward that end, the separation element is preferably provided with a frontally formed concave recess, so that a circumferential cutting edge is formed in the marginal region. This device is to ensure safe and very quick separation of also heavier conductor elements with a relatively low force propellant charge. If such a separation device is employed as electrical switch, there again results the problem of high induction voltages due to the very rapid interruption of the flow of current.

Moreover, the known devices require, for adequate acceleration of the separation element, propellant charges which constitute a certain risk potential, despite a correspondingly designed massive housing. The known device must pass costly approval tests, which involves considerable expenditure in terms of time and finances.

Differently constructed devices for the isolation of power currents, as they are known from power engineering, are not being considered here, since they are constructed in relay fashion. and thus do not begin to achieve the specified reliability (to also function reliably after 20 years without single switching and without maintenance) given the mechanical and thermal/climatic environmental conditions which occur in a motor vehicle. Moreover, such devices are still too expensive by far and/or too heavy or too large for application in automotive engineering, even with corresponding simple design.

Starting from the initially mentioned state of the art, the invention is based on the object of creating a device for isolating an electric circuit, especially for high current intensities, which, on the one side, irreversibly isolates the circuit to be severed, safely and with sufficient speed, and which, on the other side, avoids damage to structural components located within the electric circuit by induced voltage peaks.

The invention solves said object with the characteristics of Patent Claim 1.

The invention initially proceeds from the knowledge that an acceptable compromise must found with respect to the speed of the process with which an interruption takes place of the current flowing in the electric circuit, which, on the one hand, assures quick enough interruption of the current in order to avoid danger to equipment and persons from the (perhaps unduly high) current, and, on the other hand, does not interrupt the current so quickly that there may be danger to equipment and persons from induced voltage peaks; in other words, quantity-wise, the changes in electricity di(t)/dt must not become too significant.

According to the invention, in contrast to the known devices, no separation element is employed which has already been accelerated to high speeds of 150 to 200 m/s for example prior to impact on the conductor element or the isolating area of the conductor element, which isolates the conductor element extremely rapidly and extinguishes the potentially developing electric arc. Instead, the isolating area is directly acted upon by a triggering pressure or via a driving surface impinging already in the original position on the isolating area. Needless to say, the driving surface in its original position can also be located at such short distance from the isolating area that upon impact, the latter has only a relatively low speed of several meters or several tenth of meters per second.

As a result, following the generation of the triggering pressure, the separating area is isolated with sufficient speed, but not so quickly that unacceptably high induction voltages develop. Since no acceleration path is needed for an isolation element that is to be accelerated, it is possible to realize extremely small construction sizes. Such devices can be attached, for example, directly to the battery clamp of a car battery.

According to the invention, in an alternative [solution] the entire conductor cross-section can be isolated in the isolating area by actuation of pressure on the isolating area.

In another alternative, it is possible to isolate only a portion of the conductor cross-section in the isolating area, with ability for the remaining portion to still maintain, for a predetermined period of time, consumer emergency functions, especially in automotive vehicles. To that end, the remaining conductor cross-section is dimensioned in such fashion that the current which flows over the conductor cross-section is sufficient in order to heat a cross-sectionally reduced isolating area according to a safety fuse and to then fully isolate. The conductor cross-section over the length of the isolating area, and the length of the isolating area, can be dimensioned in such manner that the resistance of the reduced isolating area suffices in order to reduce the current over the conductor element to such a low value that there is no possibility of endangering equipment and persons, and that, nevertheless, emergency supply of consumers with electricity can be maintained for the pre-determined period of time until melting of the isolating area takes place. Additionally, the material of the reduced isolating area can be selected in such manner that it takes on a pre-determined resistance value.

In the preferred embodiment of the invention a chamber is provided in the housing which is filled, after activation, at least in part with an activatable, thermal energy emitting and/or gas producing medium, preferably a pyrotechnical material or a gas with internal or chemical energy, whereby via activation of the medium the triggering pressure can be generated which acts directly or via the driving surface on the isolating area.

The isolating process, by selecting the appropriate pyrotechnical mixture, and the bum-up and/or the behavior—supported by the appropriate design of the cross-section of the isolating area—can thus be controlled in such manner that the cut-off of the current, including extinction of the developing (plasma) electric arc, which develops with high current intensities, takes place with such rapidity so that it is possible to "use up" the otherwise destructively acting induction energy.

In another specific embodiment of the invention, an ignition- or igniter-piece may be provided for activation of the medium. As with known devices, this has the result that the medium is very quickly activated and the medium, in turn, very quickly develops the triggering pressure.

In another specific embodiment, a conductor is provided for activation of the medium which is heatable by electrical current or a conductor that can be brought to explosion by very high current intensity. In particular, with employment of only one heatable conductor, for example a glowing filament, one obtains the benefit of extremely simple construction and medium activation.

According to another specific embodiment of the invention, the activatable medium can be activated by means of a hot gas, which can be transmitted to the chamber, whereby the hot gas can preferably be transmitted from another device for isolating an electric circuit. In particular, this achieves that with an activation of a first device for isolating a first electric circuit, there inevitably also occurs activation of a second or of several additional devices for isolating a second or several additional electric circuits. It should be noted here that, of course, there may also be provided, in one common housing, several isolatable conductor elements with associated activatable means for isolating the respective conductor element.

According to the preferred specific embodiment of the invention, the activatable medium can be activated by thermal energy, which is emitted by the conductor element, in particular the isolating area, in the event that the temperature of the conductor element or the isolating area surpasses a pre-determined value, whereby the medium preferably maintains good thermal contact with the conductor element and/or the isolating area. Consequently, an activation of the device is also then assured if no activation device is provided that can be acted upon by means of a signal, for example in form of a glowing filament or an ignition- or igniter piece, or if an existing. actuatable activation device is non-functional or an actuating signal can no longer be generated.

In one specific embodiment of the invention, a pot-shaped driving surface is provided or a driving surface presenting a pot-shaped area, whereby the driving surface acts with the frontal surface of the outer wall upon the isolating area. The driving surface acts hereby as a punch. The isolating area is preferably designed in such manner that outside the area in which the driving surface acts with its frontal surface of the outer wall upon the isolating area, there is provided a weakening of the isolating area vis-a-vis the cross-section of the conductor element adjacent to the isolating area.

The punch-like driving surface presses or breaks out after an activation of the device either a partial piece of the isolating area which isolates the entire cross section of the isolating area or only an appropriate part. In case of the latter, the weakening of the isolating area preferably extends in form of a closed curve or a curve open only toward one side of the isolating area, so that either a perforation of the isolating area is "punched out" or a recess which is open toward one side of the isolating area.

Of course, the breaking out of partial pieces of thusly shaped isolating areas cannot only be done with the utilization of a driving surface but also with direct pressure actuation on the isolating area.

In other instances, the isolating area can also be designed in such manner that an entire piece or several partial pieces are not broken out but that the isolating area is broken up in one or several specific areas, whereby in each case there is at least a reduction of the conductor crosssection. For breaking up, the isolating area can be designed so that it breaks along weaker lines in one area and that the partial areas are bent over like flaps.

In a further specific embodiment of the invention, the interior of the pot-shaped driving surface or the pot-shaped area is filled, at least in part, with a heat activatable medium which emits thermal energy and/or generates gas after its activation, said medium preferably constituting a pyrotechnical material or a gas with interior or chemical energy, whereby the medium is in good thermal contact with the conductor element and/or the isolating area.

In another specific embodiment, the isolating area consists, at least in part, of a material having in comparison with the other conductor element, poorer conductive properties. It is possible to thus achieve, on the one hand, that this area heats up more intensively compared with the other conductor. With respect to the specific embodiments in which automatic activation of the thermal energy and/or gas producing medium is desired, with unduly high flow, by means of the thermal energy generated in the conductor element and/or in the isolating area, it is possible to achieve same in that a medium can be employed having a relatively high activation temperature, but that nevertheless triggering of the device is desired with relatively low flow and/or low conductor temperatures. Furthermore, by using a material with poorer conducting qualities in the isolating area, it is possible to obtain the function of a safety fuse, in particular with respect to specific embodiments in which the conductor element is not totally interrupted after an activation.

In such cases the conductor cross-section which is still effective after an activation can consist, at least in part, of the material having poorer conductive qualities.

In another specific embodiment there is provided, at the pressure-actuatable surface of the isolating area, a flexible membrane which seals off the chamber or the interior of the pot-shaped driving surface. As is the case with a driving surface, this ensures that upon actuation of the isolating area by pressure, there is initially no development of minor perforations in the isolating area and reduction in pressure via these perforations, without producing the desired complete or partial isolation of the isolating area.

In another specific embodiment, the driving surface can consist of memorious material, whereby the driving surface, upon surpassing a threshold temperature (activation) moves to a latent shape which, in transverse direction relative to the conductor element, presents a larger expansion than the shape of the driving surface in the original position at a temperature which is lower than the threshold temperature, whereby the driving surface supports itself, relative to the housing, with one end on a stationary stop and thus, upon activation, acts upon the isolating area with pressure, isolating same, at least partially.

In the specific embodiments of the invention where at least a partial area of the isolating area can be broken out by pressure actuation, there is preferably provided in the housing a collecting space for accepting the broken out partial area. The collecting space ensures that after an activation of the device, equipment and persons are not put at risk from fragments of the isolating area.

The collecting space may be designed geometrically—or means may be provided in the collecting space—so that after the pressure-actuated break-out and push-in of the partial area into the collecting space, the partial area is fixed in a position remote from the remaining partial area or the isolated conductor element. This prevents another unintentional closing of the severed electric circuit by broken-out conductor pieces which are located loosely in the collecting space.

In the preferred specific embodiment, following the activation of the medium in the chamber of the housing or in the interior of the pot-shaped driving surface and after the breaking-out of at least a partial area of the isolating area, a gas flow is generated over the at least partially isolated isolating area. The gas flow, which is generated by the triggering pressure exercised on the isolating area, can cool, after the break-out of a partial piece or the isolation of the isolating area, a plasma which may be generated, in case of high flows, immediately after the isolation, whereby, it is possible to additionally attain a relatively slow current decrease during the "switch-off" process and thus low induction voltages. On the other hand, the gas flow also serves for safely "blowing out" the plasma, if no isolating driving surface is employed.

In a specific embodiment according to the invention, the collecting space may have openings for the escape of the gas volume which is to be displaced from the collecting space and/or for the gas volume which is generated by the triggering pressure. Based on the dimensioning of the openings, it is possible to adjust the force of the gas flow over the isolating area in the desired fashion.

Additional specific embodiments of the invention are evident from the sub-claims. In the following, the invention is explained in more detail, based on embodiments represented in the drawing. The drawing depicts:

FIGS. 1–5 a schematic line-up in longitudinal section of five possible embodiments of the device according to the invention;

FIG. 6 a cross-section through the device according to FIG. 1;

FIG. 7 a cross section through the device according to FIG. 5;

FIG. 8 possible structures for weaknesses of the conductor cross-section in the isolating area, in schematic representation, without the conductor,—in bird's eye view respectively;

FIG. 9 Representations of conductor elements in differently weakened isolating areas (FIGS. 9a, 9b, 9c: longitudinal sections of an isolating area with unilateral or ambi-lateral weakenings over the entire conductor width and with a relatively large axial expansion: FIG. 9b: Bird's eye view of the isolating area in FIG. 9a; FIG. 9c: Bird's eye view of an isolating area of a weakening in the shape of an oval recess);

FIG. 10 Representations of conductor elements with differently weakened isolating areas (FIGS. 10a, 10e, 10f: longitudinal sections of an isolating area with respectively two axially spaced unilateral or ambi-lateral slot-shaped weakenings of the entire conductor width; FIG. 10g: longitudinal section according to FIG. 10a, but with V-shaped slots; FIG. 10h: longitudinal section according to FIG. 10a, but with cross bore at the bottom of the slots; FIG. 10b: Bird's eye view according to FIG. 10a; FIG. 10c: Bird's eye view of an isolating area with rectangular extending slot; FIG. 10d: Bird's eye view of an isolating area with circular extending slot);

FIG. 11 Representations of conductor elements with differently weakened isolating areas and concurrent design of at least a part of the isolating area in a material having poorer conductive properties (FIG. 11a: longitudinal section of an isolating area with ambi-lateral weakening over a relatively large axial expansion; FIG. 11b: Bird's eye view according to FIG. 11a; FIG. 11c: Bird's eye view according to FIG. 11a, but with lesser cross-piece width of the isolating area; FIGS. 11d, 11e: Bird's eye view on an isolating area with circular or rectangular weakening);

FIGS. 12 to 18 another embodiment each of the device according to the invention in longitudinal section.

FIGS. 1 to 5 depict, in schematic sectional representation, different embodiments of devices for isolating an electric circuit, especially for high current intensities. For reasons of simplicity, several different embodiments are integrated in one single housing 1, and are represented as acting upon one single to be isolated conductor element. Of course, in actual practice, several devices are usually not arranged in series in the depicted manner, although, in principle, this would be possible. It is, however, quite beneficial to integrate, when appropriate, several isolating devices in a single housing, with the isolating devices respectively acting on different conductor elements which are to be isolated.

In the embodiment according to FIG. 1, there is provided on one side of the conductor element 3, located in the housing, a firing chamber 5, which is filled with a pyrotechnical mixture 7. Instead of the pyrotechnical mixture there may be provided in chamber 5 a quite generally activatable medium. The activatable medium need not totally fill out the firing chamber as is the case with respect to the represented embodiments according to FIGS. 1 to 3 and 12 to 18. In fact, in general, a lesser volume of an activatable medium will suffice in order to generate sufficiently high pressure to act upon an isolating area 9 of the conductor element 3 in such manner that it breaks out, at least in part, and the current is interrupted via the conductor element 3.

FIG. 4 depicts an embodiment where the firing chamber 5 is only partially filled with a pyrotechnical mixture 7 or an activatable medium. In order to ensure that the activatable medium is in good thermal contact with the isolating area 9 or the conductor element 3—for reasons explained below—a spring-loaded plate 11 is provided which presses the mostly powdery medium in the direction toward the isolating area 9. With activation of the medium for generating the trigger pressure, the spring-loaded plate again releases the volume of the firing chamber almost completely. The isolating area 9 is preferably designed in some weakened fashion in order to facilitate easier breaking out or breaking up. To that end, FIGS. 8a and 8b show corresponding linear structures which can be introduced into the isolating area, for example by stamping or similar. The linear weakenings are preferably provided at the side of the isolating area 9 which faces the firing chamber 5. In such arrangement, the structures represented in FIGS. 8a and 8b can be introduced, either totally or only partially, in the surface of the isolating area 9. In this respect, the structures are to be considered, for example, as structures of a press die, which may have a larger or smaller diameter than the diameter or the width of the isolating area 9. In addition, the structures may be provided on the isolating area centrally or off-center in relation to the axis of the conductor element 3.

The centrally arranged structures of FIGS. 8a and 8b present connection lines which extend between a closed circumferential line. It is possible, as a result, that the isolating area is broken up in wing-like fashion, whereby the wings respectively remain connected with the isolating area at the circumferential line and the isolating area breaks up at the intersecting lines.

Overall, the isolating area 9 itself, as represented in FIG. 2, may have a smaller cross-section than the remaining conductor element 3. The additional weakening structures according to FIGS. 8a and 8b can also be provided in addition.

With respect to the specific embodiments represented in FIGS. 1, 2, 5 to 14, 17 and 18, the activatable medium can preferably be activated in two different ways: one the one hand, an ignition- or igniter element 13 may be provided that can be acted upon via an electrical signal, for example the triggering signal of an air bag, activating the activatable medium 7.

On the other hand, the activatable medium can be in excellent heat-conductive contact with the conductor element 3 or the isolating area 9. With employment of a temperature-sensitive activatable medium it is possible to achieve that the device is triggered if the conductor element and/or the isolating area surpass a pre-determined threshold temperature.

With respect to both these possibilities, by combining the respective firing chamber 5 by means of channels, several devices can be triggered simultaneously or successively with slight temporal delay. Said possibility is schematically represented in FIGS. 2 to 4, wherein, after activation of the device in FIG. 2, the devices in FIGS. 3 and 4 are inevitably also activated.

It is obvious from FIG. 6, which represents a cross-section through FIG. 1, that for sealing of the firing chamber 5 vis-a-vis the isolating area 9 or the conductor element 3, the firing chamber may present a lesser width (vertically to the conductor element) and a packing 15 may be provided at the shoulder between firing chamber and the isolating area or the conductor element, for example in form of an O-ring. It is also possible to have, instead of using an O-ring, a firm connection between the conductor element and the housing, for example by means of welding, gluing or by directly spraying around the conductor.

FIGS. 5 and FIG. 7, presenting said specific embodiment in cross-section, depict the utilization of a driving surface 17, designed in plate shape, with the firing chamber vis-a-vis the driving surface 17 or the conductor element and the isolating area 9 again being able to be sealed of by means of a packing 15. The driving surface ensures that with pressure actuation of the isolating area there is not just created a minor perforation, through which the gas which generates the pressure escapes, without totally breaking out or breaking up the isolating area 9 in the desired fashion. In addition, the driving surface is preferably dimensioned in such manner that the medium 7 in the firing chamber 5 is in excellent heat-conductive contact with the conductor element 3 or the isolating are 9.

All the specific embodiments represented in the drawing have in common that a collection space 19 is provided on the side of the isolating area 9 which faces the firing chamber. Said collection space serves for acceptance of the partial pieces broken out of the isolating area or for acceptance of the bent ends of the conductor elements of the wing-like fractionated and bent parts of the isolating area.

As depicted in FIG. 3, the collection space 19 can be designed tapered in downward direction, i.e. in the direction away from the isolating area 9, so that a sheared-off partial piece, which is pushed under pressure into the collection space, is securely retained in same. As a result, movements or vibrations of the device cannot result in unwelcome re-closing of the current path via the conductor element 3.

FIG. 3 depicts another solution possibility in this regard: At the side wall of the collection space 19 there are provided one or several projections which cause locking of the sheared-off isolating area 9 in the lower part of the collection space.

The isolating areas 9 or conductor elements 3 which are represented in FIGS. 9, 10 and 11 can be employed in connection with each represented embodiment of the invention-specific device.

FIG. 9 depicts isolating areas 9, which are respectively weakened over the full width, unilaterally on top (FIG. 9a, FIG. 9b as bird's eye view according to FIG. 9a), unilaterally at the bottom (FIG. 9d) or ambi-laterally (FIG. 9e). FIG. 9c depicts, in bird's eye view, onto a conductor element 3, a possibility of weakening the isolating area 9 in form of a recess with elliptical structure, when viewed from above. By breaking out the bottom of the weakened structure, the path of the current via the conductor element is not immediately totally interrupted, but reduced in its cross-section. Consequently, with appropriate dimensioning of the remaining conductor cross-section it is possible to maintain an emergency supply to consumers. Said conductor cross-section is preferably dimensioned in such an arrangement that the resistance of the isolating area in the path of the current increases to the extent that the intensity of the current returns to an admissible value. In addition, the remaining conductor cross-section may be dimensioned in such manner that the current flowing via the isolating area after breaking out a part of the isolating area, heats up the remaining conductor cross-section in such fashion that the isolating area burns through like a safety fuse after a pre-determined time period.

FIG. 10 depicts additional possibilities for weakening the isolating area 9, whereby, in each case, provision is made for only narrow indentations. In contrast to the specific embodiments according to FIGS. 9 and 11, it is the goal in this case that the thermal capacity of the isolating area is not reduced to any significant degree and that the isolating area heats up more slowly with high current intensities.

The indentation can extend over the entire width of the isolating area 9, whereby, in this case, two axially spaced apart indentations are preferably provided. In these instances, the area between the indentations is broken out. The indentations may extend from the top (FIGS. 10a and its bird's eye view 10b, FIG. 10h) from the bottom (FIG. 10e) or from bottom and top (FIG. 10f).

In order to optimize the shearing-off behavior, the indentations may be equipped, internally, with a cross-bore (FIG. 10h) or designed tapering toward the interior (FIG. 10g). Analogous to FIG. 9c, the indentations may also be provided with randomly extending closed curves, so that only the pertinent areas of the isolating area are broken out, initially causing no full interruption of the path of the current but only reduction in the conductor cross-section (compare above).

FIG. 11 represents specific embodiments of the isolating area similar to FIG. 9, whereby, however, the partial piece of the isolating area to be broken out consists of a material having poorer conductive properties than the material of the remaining conductor element 3. As a result, the isolating area takes on a higher temperature vis-a-vis the other conductor element. This may serve for provoking triggering of the device dependent upon the temperature of the conductor element 3 or the isolating area 9 with relatively low temperature of the conductor 3 or in order to be able to utilize a medium which requires high triggering temperature.

With respect to the specific embodiment represented in FIG. 12, a pot-shaped driving surface 23 is used. Above the driving surface 23 there is the firing chamber 5, whereby the propellant charge or the activatable medium located therein, can be triggered by means of an ignition- or igniter piece 13, or, quite generally, by means of an actuatable ignition means. The driving surface rests against a stop shoulder 25 in housing 1.

The interior 27 of the driving surface likewise contains a medium 7 which is temperature activatable, which is in excellent heat-conductive contact with the conductor element 3 or the isolating area 9. The interior space 27 is in communication with the firing chamber 5 via openings 29 in the ceiling wall of the driving surface.

The openings 29 may be blocked, for example by means of a foil, whereby the blockage between the interior space 27 and the firing chamber 5 is pierced when a pre-determined pressure difference is surpassed. With this specific embodiment is it is therefore possible upon selective activation of the medium in the firing chamber 5, to also activate the medium 7 with the driving surface 23, unless, prior to reaching the pressure needed for piercing the blockage, the pressure actuation of the isolation area 9 via the frontal sides of the lateral wall of the pot-shaped driving surface becomes to strong, that the pertinent portion of the isolating area is broken out or broken up and the driving surface, possibly jointly with the broken out partial piece, moves into the collection space 19. If the medium 7 in the interior is additionally activated, another pressure increase takes place and the pertinent partial piece of the isolating area is broken out.

In the event that in the specific embodiment according to FIG. 12, the medium 7, if first activated in the interior space 27 of the driving surface, and if the thereby generated pressure is insufficient in order to break up or break out the isolating area 9, then, effective from a certain pressure, the blockage of the openings 29 breaks and the medium in the firing chamber 5 is additionally activated. This provides assurance that in each instance the isolating area is broken off or broken up in the desired fashion.

The sealing of the firing chamber 5 is effected by means of a packing 30, for example an O-ring between the outer wall of the driving surface 23 and the inner wall of housing 1. For sealing of the interior space 27 of the driving surface 23, there is a sealing foil 31 between the underside of the driving surface 23 and the conductor element 3. After breaking out the isolating area 9, the sealing effect of foil 31 is eliminated so that the plasma can be blown out via the gas flow into the collection space 19. If such blow effect is desired in each instance, the blockage of the openings 29 must be designed in such manner that the blockage is broken even with activation of the medium 7 in the firing chamber 3.

FIG. 13 depicts a specific embodiment which essentially agrees with the specific embodiment according to FIG. 12. Instead of a sealing foil, however, an annular packing 33 is used between the frontal side of the lateral wall of the driving surface 23 and the conductor element 3 or the isolating area 9. The ceiling wall 23a of the driving surface 23 in this specific embodiment is designed concave in the direction toward the firing chamber 5. This results in improved sealing of the outer wall of the driving surface relative to the interior wall of the housing. In addition, a foil 35 is used which serves for maintaining the activatable medium 7, which does not totally fill out the firing chamber, in good contact with the ignition- or igniter piece 13.

The specific embodiment according to FIG. 14a in turn largely corresponds to the specific embodiment in FIG. 12, whereby the driving surface 23, however, presents an enlarged upper area which is actuatable in the firing chamber 5 by the medium 7, and a pot-shaped lower area with smaller diameter. This results in the benefit that a higher pressure can be exercised via the frontal side of the lateral wall upon the conductor element 3 or the isolating area 9 than in the specific embodiment according to FIG. 12. A guide ring 37 is provided in the housing for guiding the driving surface 23.

The frontal side of the lateral wall of the driving surface 23 can present, in the specific embodiments according to FIGS. 12 to 14a, for further increase in pressure or shearing effect, cross sections depicted in FIG. 14b, for example.

Figure 15B:
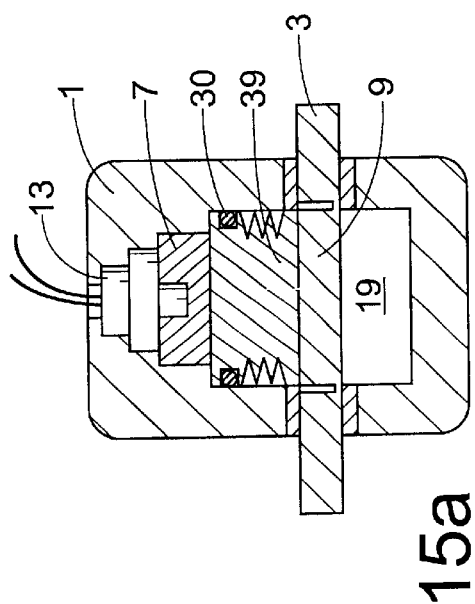

FIGS. 15a and 15b represent a specific embodiment where, instead of the driving surface 23 in FIGS. 12 to 14a, which accepts an activatable medium in its interior, a driving surface of memorious material is employed. Self-triggering from inadmissibly high temperature of the conductor element 3 or the isolating area 9 is obtained in that upon surpassing a threshold temperature, the memorious material leaps back to memorized shape, which presents, in the direction of the longitudinal axis of the driving surface 39, a greater axial length. With self-triggering there then results the position of the driving surface 39 depicted in FIG. 15b, in which the driving surface has broken out the isolating area 9 and pressed into the collection space 19. In order to permit a greater change in length of the driving surface, said collection space 19 presents a bellows-like shaped wall.

Figure 16A:
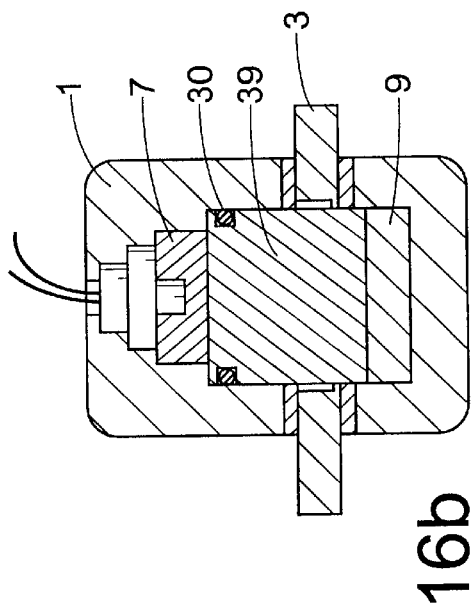
Figure 16B:
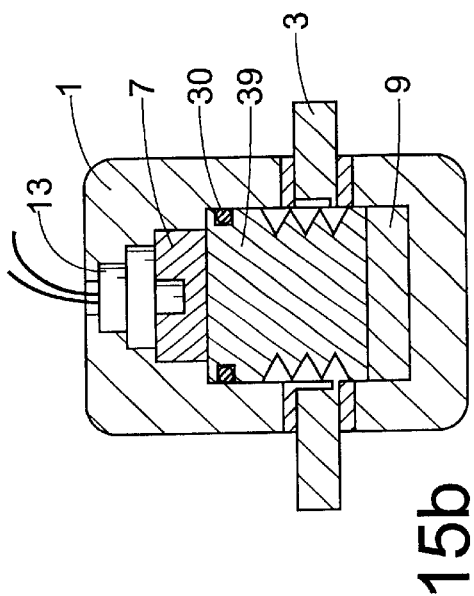

The specific embodiment according to FIGS. 16a and 16b is identical, to the largest extent possible, with the specific embodiment according to FIGS. 15 and 15b, the only difference being the absent indented or bellows-like outer wall of the driving surface 39.

With respect to the device according to FIG. 17, which largely agrees with the specific embodiment according to FIG. 5, a plate-shaped driving surface 41 is employed which has a bellows-like side wall extending in upward direction in which the activatable medium is accepted. The side wall is sealed off at the upper end with the upper inner wall of the firing chamber 5.

With this specific embodiment it can thus be taken for granted that also after activation of the medium all residues will remain within the driving surface 41. In this specific embodiment as well, the driving surface is preferably designed in such manner that the medium 7 is in excellent heat-conductive contact with the conductor element 3 or the isolating area 9 in order to facilitate self-triggering.

The specific embodiment according to FIGS. 18a and 18b, is largely identical with the specific embodiment according to FIG. 1. For sealing off the firing chamber 5 vis-a-vis the conductor element 3, however, a foil 43 is employed, which is accepted in the housing wall, together with the conductor element. The foil is so flexible that it is stretched after the break-out and pressed together with the isolating area 9 into the collecting space 19. With this specific embodiment as well, all constituents of the medium 7 remain within the housing, even then if discharge openings should be provided in the wall of the collector space in order to let the gas escape which is contained in the collector space. If, however, as explained above, a blowing action is to be achieved, foil 41 must be designed in such manner that it will tear, effective with a given excessive expansion in order to permit flow of gas.

In conclusion, it should be noted that, of course, all characteristics which were described earlier with respect to individual specific embodiments, can also be utilized in connection with other specific exemplary embodiments.

The activatable medium can also be an inert gas, which is enclosed in chamber 5 or the interior space 7 of the driving surface 23. The gas can then be heated up in "jolt-like" fashion (activated) with the appropriate means, so that a triggering pressure is created. Said means may involve a glowing filament or an explosion wire.

What is claimed is:

1. A fuse device for isolating an electric circuit from high current intensities, the fuse device comprising:
   a housing defining a chamber;
   at least one electric conductor element extending in the housing; and,
   an isolating area connected to the at least one electric conductor and forming a severable electric circuit in such manner that a severable current path runs in series via the isolating area and through the at least one conductor element;
   activatable means, provided in the housing for generating a triggering pressure, which selectively acts upon the isolating area to sever at least a portion of the isolating area after selective activation of the activatable means, the isolating area being thereafter at least a one of totally broken out and a cross-section of the isolating area being reduced, the actuatable means being a memory material disposed in said chamber, the memory material being selectively activated to attain a memorized shape for movement toward said isolating area in response to a temperature greater than a selected threshold temperature and being supported relative to said housing in response to a temperature lower than said threshold temperature.

2. The fuse device according to claim 1 wherein:
   the housing (1) defines a chamber (5); and,
   the actuatable means is an actuatable medium (7) disposed in said chamber (5), the actuatable medium being selectably actuated to generate a triggering pressure for acting on said isolating area (9).

3. The fuse device according to claim 2 wherein said isolating area (9) is adapted to respond to said triggering pressure by at least a one of potentially fragmenting to form an isolating member portion having a predetermined size permitting current flow through the isolating area, and completely fragmenting to form a break in the isolating member to prevent current flow through the isolating member.

4. The fuse device according to claim 3 wherein the isolating area (9) includes a portion weakened in cross section relative to remaining portions of the isolating area (9) and relative to the at least one conductor element (3).

5. The fuse device according to claim 4 wherein the isolating area (9) has a selected resistance for generating heat in response to current flow in the fuse device.

6. The fuse device according to claim 2 wherein the activatable medium (7) is adapted to generate a gas flow adjacent said isolating area (9) for extinguishing plasma arcs in said housing.

7. The fuse device according to claim 2 further including an ignitor member (13) adapted to selectively ignite said actuatable medium (7) in response to an external trigger signal.

8. The fuse device according to claim 2 further including an ignitor conductor adapted to selectively ignite said actuatable medium in response to a current level in said fuse device.

9. The fuse device according to claim 2 further including a driving member (23) disposed in said housing (1) and adapted to engage said insulating area (9) and move to at least partially sever the isolating area (9) in response to said triggering pressure generated by said actuatable medium (7).

10. The fuse device according to claim 2 further including a collector space (19) formed by the housing (1) adjacent said isolating area (9) for receiving portions of the isolating area (9) separated after said triggering pressure is generated.

11. The fuse device according to claim 10 wherein the collector space (19) is adapted to hold said portions of the isolating area (9) separated after said trigger pressure is generated.

12. The fuse device according to claim 10 wherein said collector space (19) defines opening in said housing (1) for escape of a gas volume from said housing.

13. A fuse device for isolating an electric circuit from high current intensities, the fuse device comprising:
   a housing defining a chamber;
   at least one electric conductor element extending in the housing;
   an isolating area connected to the at least one electric conductor and forming a severable electric circuit in such manner that a severable current path runs in series via the isolating area and through the at least one conductor element;
   activatable means, provided in the housing for generating a triggering pressure, which selectively acts upon the isolating area to sever at least a portion of the isolating area after selective activation of the activatable means, the isolating area being thereafter at least a one of totally broken out and a cross-section of the isolating area being reduced;
   the activatable means being an actuatable medium disposed in said chamber, the actuatable medium being selectably actuated to generate a triggering pressure for acting on said isolating area;

a driving member disposed in said housing and adapted to engage said insulating area and move to at least partially sever the isolating area in response to said triggering pressure generated by said actuatable medium, the driving member being cup-shaped and defining a cup-shaped interior space; and, the fuse device including a pyrotechnical material disposed in said interior space and in intimate thermal contact with said isolating area, the pyrotechnical material being selectively actuated by said heat of the isolating area to ignite and generate said triggering pressure.

14. The fuse device according to claim 13 further including a flexible membrane (31) for sealing between the chamber (5) and at least one of the activatable medium (7) and the interior space (27) of the cup-shaped driving member (23).

15. A fuse device for isolating an electric circuit from high current intensities, the fuse device comprising:

a housing defining a chamber;

at least one electric conductor element extending in the housing;

an isolating area connected to the at least one electric conductor and forming a severable electric circuit in such manner that a severable current path runs in series via the isolating area and through the at least one conductor element;

activatable means, provided in the housing for generating a triggering pressure, which selectively acts upon the isolating area to sever at least a portion of the isolating area after selective activation of the activatable means, the isolating area being thereafter at least a one of totally broken out and a cross-section of the isolating area being reduced;

the activatable means being an actuatable medium disposed in said chamber, the actuatable medium being selectably actuated to generate a triggering pressure for acting on said isolating area;

the housing including a conduit extending into said chamber and leading from an external associated fuse device; and, the actuatable medium being responsive to hot gases flowing into the housing from the conduit to ignite and generate said triggering pressure.

16. A fuse device for isolating an electric circuit from high current intensities, the fuse device comprising:

housing a defining chamber;

at least one electric conductor element extending in the housing;

an isolating area connected to the at least one electric conductor and forming a severable electric circuit in such manner that a severable current path runs in series via the isolating area and through the at least one conductor element;

activatable means, provided in the housing for generating a triggering pressure, which selectively acts upon the isolating area to sever at least a portion of the isolating area after selective activation of the activatable means, the isolating area being thereafter at least a one of totally broken out and a cross-section of the isolating area being reduced;

the activatable means being an actuatable medium disposed in said chamber, the actuatable medium being selectably actuated to generate a triggering pressure for acting on said isolating area;

the isolating area having a selected resistance for generating heat in response to current flow in the fuse device; and, the actuatable medium being in intimate thermal contact with said isolating area, the actuatable medium being selectively activated by said heat of the isolating area to ignite and generate said triggering pressure.

\* \* \* \* \*